US007676320B2

(12) United States Patent
Aliakarzadeh et al.

(10) Patent No.: US 7,676,320 B2
(45) Date of Patent: Mar. 9, 2010

(54) METHOD AND DEVICE FOR OPERATING AN INTERNAL COMBUSTION ENGINE

(75) Inventors: Reza Aliakarzadeh, Regensburg (DE); Klaus Bayerle, Obertraubling (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 12/210,404

(22) Filed: Sep. 15, 2008

(65) Prior Publication Data

US 2009/0078242 A1 Mar. 26, 2009

(30) Foreign Application Priority Data

Sep. 21, 2007 (DE) ...................... 10 2007 045 264

(51) Int. Cl.
*B60T 7/12* (2006.01)
*F02M 1/00* (2006.01)

(52) U.S. Cl. ...................................... 701/103; 123/434

(58) Field of Classification Search ................. 701/103, 701/104, 108, 114; 123/434, 673, 691, 687
See application file for complete search history.

(56) References Cited

U.S. PATENT DOCUMENTS 6,044,826 A * 4/2000 Bayerle et al. ......... 123/568.16
6,276,349 B1 8/2001 Kofler et al. ................ 123/673
7,360,523 B2 * 4/2008 Sloane et al. ............... 123/305
2007/0113546 A1 * 5/2007 Jankovic ...................... 60/287
2007/0272203 A1 * 11/2007 Sloane et al. ............... 123/295

FOREIGN PATENT DOCUMENTS

| | | |
|---|---|---|
| DE | 3839611 | 11/1988 |
| DE | 19846393 | 10/1998 |
| DE | 102004004291 | 1/2004 |
| DE | 102004044808 | 9/2004 |

* cited by examiner

*Primary Examiner*—John T Kwon
(74) *Attorney, Agent, or Firm*—King & Spalding L.L.P.

(57) ABSTRACT

In a lower partial load range of, a setpoint value of the mass flow of air into the combustion chambers is determined as a function of a predefined torque request such that it is greater than necessary for implementing the predefined torque request and large enough that individual exhaust packets can be differentiated from one another with the exhaust gas probe. Depending on the air/fuel ratio setpoint value, an actuator is actuated whose position affects the actual air mass flow. To implement the torque request, engine efficiency is simultaneously reduced by actuating another actuator. A measurement signal of the exhaust gas probe is detected. The air/fuel ratios of the exhaust packets are determined as a function of the measurement signal detected. At least one operating parameter affecting the air/fuel ratio in at least one of the cylinders is adapted as a function of the air/fuel ratios determined.

19 Claims, 2 Drawing Sheets

METHOD AND DEVICE FOR OPERATING AN INTERNAL COMBUSTION ENGINE

CROSS-REFERENCE TO RELATED APPLICATIONS

This application claims priority to German application number 10 2007 045 264.2 filed Sep. 21, 2007, the contents of which is hereby incorporated by reference in its entirety.

TECHNICAL FIELD

The invention relates to a method and a device for operating an internal combustion engine. The internal combustion engine has at least two cylinders each comprising a combustion chamber. The internal combustion engine additionally has an exhaust tract which communicates with the combustion chambers depending on positions of at least two exhaust valves and in which there is disposed at least one exhaust gas probe whose measurement signal is indicative of an air/fuel ratio prior to combustion of an air/fuel mixture in the combustion chambers.

BACKGROUND

In an internal combustion engine, an air/fuel ratio in a combustion chamber of said internal combustion engine prior to a combustion process critically affects engine efficiency and emissions during the combustion process. The air/fuel ratio of an air/fuel mixture prior to combustion can be determined e.g. by measuring the residual oxygen content and/or residual hydrocarbon content of the exhaust gas from the combustion process. For this purpose exhaust gas probes can be used, for example, which are implemented as lambda probes. The lambda probe is preferably disposed in an exhaust tract of the internal combustion engine upstream and/or downstream of a catalytic converter. In an upper partial load range or in the full load range of the internal combustion engine, the mass flow of air through the internal combustion engine, particularly through the combustion chambers and exhaust tract, is so large that air/fuel ratios of individual exhaust packets from different combustion chambers can be differentiated from one another by means of the lambda probe. This allows cylinder-selective closed-loop lambda control of the air/fuel ratio in the upper partial load range and in the full load range.

SUMMARY

A method and a device for operating an internal combustion engine can be created which allow particularly low-emission and/or low-consumption operation of the internal combustion engine in a lower partial load range of the internal combustion engine.

According to an embodiment, a method for operating an internal combustion engine with at least two cylinders each incorporating a combustion chamber, and with an exhaust tract which communicates with the combustion chambers depending on positions of at least two exhaust valves and in which there is disposed at least one exhaust gas probe whose measurement signal is indicative of an air/fuel ratio prior to combustion of an air/fuel mixture in the combustion chambers, may comprise the steps of: in a lower partial load range of the internal combustion engine, as a function of a predefined torque request to the internal combustion engine, —determining a setpoint value of a mass flow of air into the combustion chambers such that it is greater than is necessary for implementing the predefined torque request, and that it is large enough that individual exhaust packets from different combustion chambers can be differentiated from one another with the exhaust gas probe, —actuating an actuator as a function of the setpoint value of the air/fuel ratio whose position affects the actual mass flow of air into the combustion chambers, and to implement the torque request, reducing engine efficiency simultaneously by actuating another actuator, —detecting a measurement signal of the exhaust gas probe, —determining the air/fuel ratio of the exhaust packets as a function of the measurement signal detected, and —adapting at least one internal combustion engine operating parameter affecting the air/fuel ratio in at least one of the cylinders as a function of the air/fuel ratios.

According to another embodiment a device for operating an internal combustion engine with at least two cylinders each incorporating a combustion chamber, and with an exhaust tract which communicates with the combustion chambers depending on positions of at least two exhaust valves and in which there is disposed at least one exhaust gas probe whose measurement signal is indicative of an air/fuel ratio prior to combustion of an air/fuel mixture in the combustion chambers, may be designed, in a lower partial load range of the internal combustion engine, as a function of a predefined torque request to the internal combustion engine, —to determine a setpoint value of a mass flow of air into the combustion chambers such that it is greater than is necessary for implementing the predefined torque request, and that it is large enough that exhaust packets from different combustion chambers can be differentiated from one another with the exhaust gas probe, —to actuate, as a function of the setpoint value of the air/fuel ratio, an actuator whose position affects the actual mass flow of air into the combustion chambers, and in order to implement the torque request, to simultaneously reduce engine efficiency by actuating another actuator, —to detect a measurement signal of the exhaust gas probe, —to determine the air/fuel ratio of the exhaust packets as a function of the measurement signal detected, and —to adapt, as a function of the air/fuel ratios determined, at least one internal combustion engine operating parameter affecting the air/fuel ratio in at least one of the cylinders.

According to a further embodiment, the efficiency of the internal combustion engine may be reduced by retarding an ignition angle at which the air/fuel mixture is ignited in the respective combustion chamber. According to a further embodiment, sampling instants of the exhaust gas probe can be adapted to the ignition angle set. According to a further embodiment, the mass airflow setpoint value can be determined only such that it is greater than is necessary for implementing the predefined torque request, and may be large enough that individual exhaust packets from the different combustion chambers can be differentiated from one another with the exhaust gas probe, or wherein the thus determined mass airflow setpoint value may be only implemented if at least one predefined condition for cylinder-selective closed-loop lambda control of the air/fuel ratio is fulfilled. According to a further embodiment, cylinder-selective closed-loop lambda control of the air/fuel ratios of the exhaust packets may be activated and the operating parameter may be adapted as a function of an output signal of a closed-loop controller for regulating the air/fuel ratio.

BRIEF DESCRIPTION OF THE DRAWINGS

The invention will now be explained in greater detail with reference to the accompanying drawings in which.

Elements of identical design or function are identified by the same reference characters throughout the figures.

DETAILED DESCRIPTION

Figure 1:
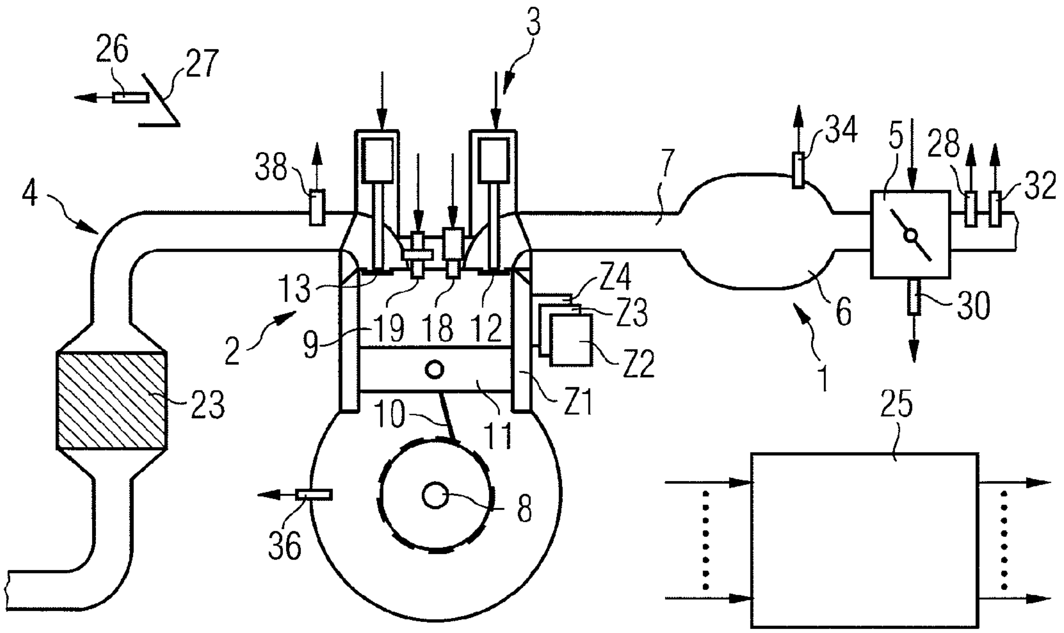
FIG. 1 shows an internal combustion engine.

The internal combustion engine has at least two cylinders and an exhaust tract. The two cylinders each comprise a combustion chamber. The exhaust tract communicates with the combustion chambers depending on positions of at least two exhaust valves. In addition, there is disposed in the exhaust tract at least one exhaust gas probe whose measurement signal is indicative of an air/fuel ratio prior to combustion of an air/fuel mixture in the combustion chambers. In a lower partial load range of the internal combustion engine, a setpoint value of a mass flow of air into the combustion chambers is determined as a function of a predefined engine torque request such that it is greater than is necessary for implementing the predefined torque request, and that it is sufficiently large that individual exhaust packets from different combustion chambers can be differentiated from one another using the exhaust gas probe. An actuator whose position affects the actual mass flow of air into the combustion chambers is controlled as a function of the setpoint value of the air/fuel ratio. To implement the torque request, engine efficiency is simultaneously reduced by actuating another actuator. A measurement signal of the exhaust gas probe is detected. The air/fuel ratios of the exhaust packets are determined as a function of the measurement signal detected. At least one engine operating parameter affecting the air/fuel ratio of at least one of the cylinders is adjusted as a function of the air/fuel ratios determined.

Increasing the actual mass airflow enables the individual exhaust packets to be differentiated from one another by means of the exhaust gas probe in the lower load range of the internal combustion engine. The exhaust gas probe may preferably be a lambda probe. Differentiation between the individual exhaust packets enables the operating parameter and the cylinder-selective closed-loop lambda control of the air/fuel ratio to be adjusted in the lower partial load range of the internal combustion engine. Adjusting the operating parameter can also be termed adapting the operating parameter. The adapted operating parameter can then be used in the lower partial load range during normal operation, i.e. without artificially increased actual mass airflow. The adapted operating parameter can also be used in the lower partial load range for controlling the internal combustion engine. Cylinder-selective closed-loop lambda control of the air/fuel ratio in the lower partial load range provides a simple means of detecting cylinder-specific uneven distribution of the air/fuel ratio and adjusting the operating parameter accordingly. The operating parameter may preferably be adjusted such that the air/fuel ratios of consecutive exhaust packets are at least approximately equal. The actuator which affects the actual mass airflow comprises, for example, a throttle valve in an intake tract of the internal combustion engine upstream of the combustion chambers. An actuating signal for the actuator is determined as a function of the mass airflow setpoint value determined, and the actuator is controlled by means of the actuating signal determined. The operating parameter affects, for example, fuel metering in at least one of the cylinders and/or an opening behavior of at least one gas exchange valve and/or a position of the throttle valve. Increasing the actual mass airflow and reducing the efficiency can also be termed boosting a torque reserve.

In an embodiment, the efficiency of the internal combustion engine is reduced by retarding the ignition angle at which the air/fuel mixture is ignited in the respective combustion chamber. This provides a simple means of reducing efficiency. Retarding the ignition angle means, in this context, that ignition takes place at a greater crankshaft angle than prior to adjusting the ignition angle.

In another embodiment, sampling instants of the exhaust gas probe are matched to the adjusted ignition angle. This helps the exhaust gas probe to differentiate particularly well between the individual exhaust packets from the different cylinders. At the sampling instants, the exhaust gas probe measures the air/fuel ratio of the exhaust packet currently flowing past the exhaust gas probe.

In another embodiment, the mass airflow setpoint value is only determined such that it is greater than is necessary for implementing the predefined torque request and large enough that individual exhaust packets from the different exhaust chambers can be differentiated from one another by the exhaust gas probe, or where the mass airflow setpoint value thus determined is only implemented if at least one predefined condition for cylinder-selective closed-loop lambda control of the air/fuel ratio is fulfilled. This contributes to the fact that the mass airflow is only increased and the efficiency of the internal combustion engine only reduced if, on the basis of the fulfilled condition, cylinder-selective closed-loop lambda control is possible, and that the mass airflow is not increased unnecessarily and the efficiency is not reduced unnecessarily, which may result in increased fuel consumption and/or increasing production of emissions compared to normal operation.

In another embodiment, cylinder-selective closed-loop lambda control of the air/fuel ratios of the exhaust packets is activated and the operating parameter is adjusted as a function of an output signal of a closed-loop controller for controlling the air/fuel ratio. This enables the operating parameter to be adjusted in a particularly simple and precise manner. An internal combustion engine (FIG. 1) comprises an intake tract 1, a cylinder block 2, a cylinder head 3 and an exhaust tract 4. The intake tract 1 may preferably comprise a throttle valve 5, a plenum 6 and an intake manifold 7 which is routed through to a cylinder Z1 via an intake port into a combustion chamber 9 of the cylinder block 2. The combustion chamber 9 communicates with the intake tract 1 depending on a position of an intake valve 12 and with the exhaust tract 4 depending on a position of an exhaust valve 13. The cylinder block 2 comprises a crankshaft 8 which is linked to a piston 11 of the cylinder Z1 via a connecting rod 10. The internal combustion engine comprises, in addition to the cylinder Z1, at least two, preferably a plurality of cylinders Z1-Z4. The internal combustion engine may preferably be disposed in a motor vehicle.

In the cylinder head 3 there may preferably be disposed an injection valve 18 and a spark plug 19. Alternatively, the injection valve 18 can also be disposed in the intake manifold 7. In the exhaust tract 4 there may preferably be disposed a catalytic converter 23 which may preferably be implemented as a three-way catalytic converter. If the internal combustion engine is a diesel, the internal combustion engine can also be implemented without the spark plug 19.

A control device 25 is provided to which sensors are assigned which detect the various measured variables and determine the value of the measured variable in each case. Operating variables comprise the measured variables and internal combustion engine variables derived therefrom. Operating variables can be indicative of a current operating state of the internal combustion engine. The control device 25 determines, as a function of at least one of the operating variables, at least one manipulated variable which is then converted into one or more actuating signals for controlling the actuators by means of corresponding actuating drives. The control device 25 can also be termed a device for operating the internal combustion engine.

The sensors are, for example, a pedal position sensor 26 which detects a position of an accelerator pedal 27, a mass airflow sensor 28 which detects a mass flow of air upstream of the throttle valve 5, a throttle valve position sensor 30 which detects a degree of opening of a throttle valve 5, a temperature sensor 32 which detects an intake air temperature, an intake manifold pressure sensor 34 which detects an intake manifold pressure in the plenum 6, a crankshaft angle sensor 36 which detects a crankshaft angle to which a speed of the internal combustion engine is assigned. An exhaust gas probe 38 is additionally provided which is disposed upstream of the catalytic converter 23 and, for example, detects the residual oxygen content of the exhaust gas and whose measurement signal is indicative of an air/fuel ratio in the combustion chamber 9 of the cylinder Z1 prior to a combustion process. The exhaust gas probe 38 may be preferably a lambda probe LS.

Depending on the embodiment, any subset of the abovementioned sensors can be present or additional sensors may also be present.

The actuators are e.g. the throttle valve 5, the intake and exhaust valves 12, 13, the injection valve 18 and/or the spark plug 19.

Figure 2:
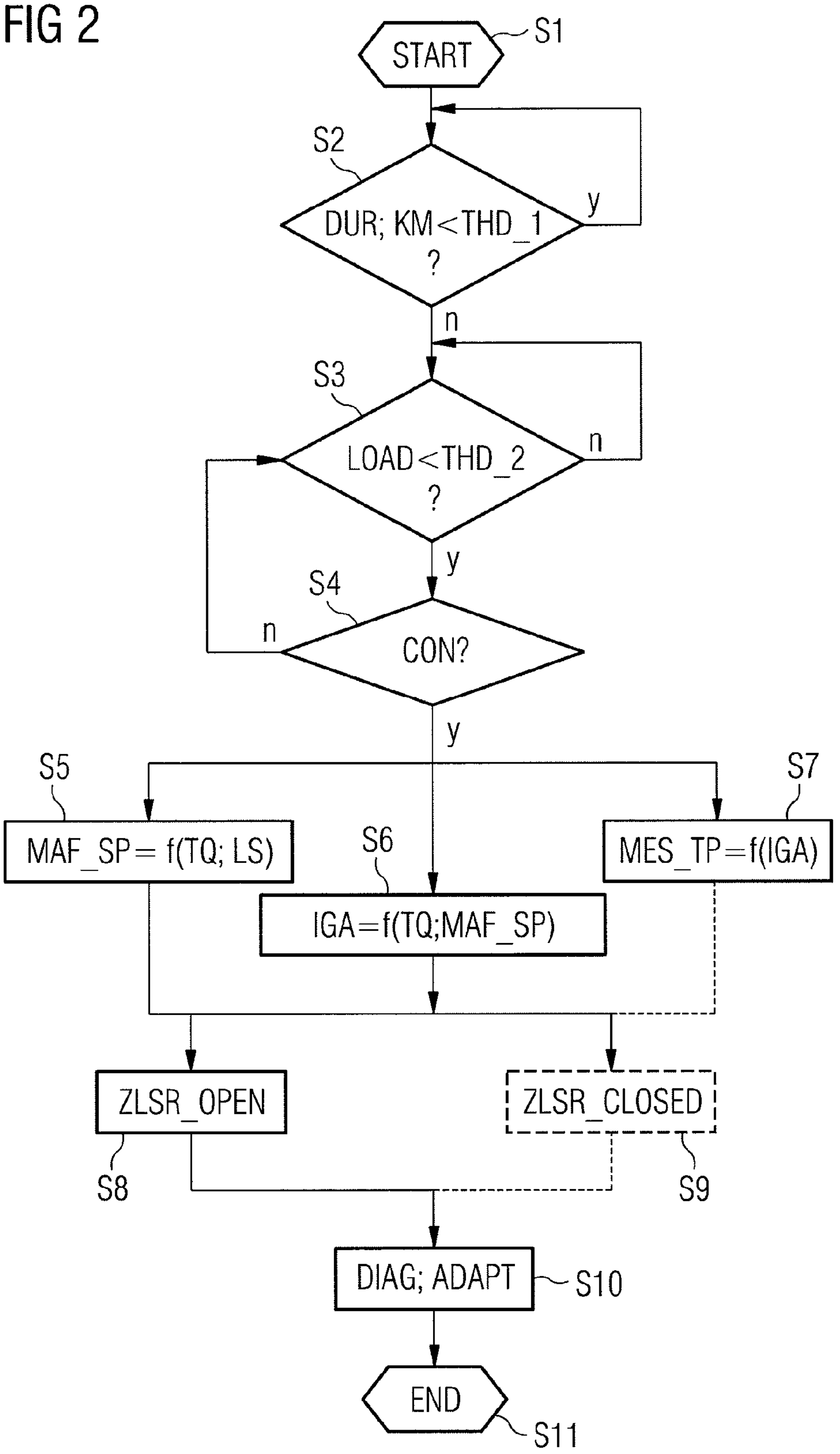
FIG. 2 shows a flowchart of a program for operating the internal combustion engine.

A program for operating the internal combustion engine may be preferably stored in the control device 25 (FIG. 2). The program is used to increase an actual mass airflow through the exhaust tract 4 in a lower partial load range of the internal combustion engine 4 so that air/fuel ratios of exhaust packets from different combustion chambers 9 of the internal combustion engine can be measured and differentiated from one another by means of the exhaust gas probe 38, to reduce engine efficiency such that a torque request TQ e.g. of a driver of the motor vehicle is implemented as required, and to adjust, in other words adapt, at least one engine operating parameter which, after execution of the program, can be used in the lower partial load range during normal operation of the internal combustion engine. Normal operation in this context means that the actual mass airflow is not increased solely to differentiate between the exhaust packets and that the efficiency is not reduced to implement the torque request. In addition, the adapted operating parameter can be used, with or without increasing a torque reserve, for controlling the internal combustion engine particularly in the lower partial load range.

The program may be preferably initiated simultaneously with starting of the internal combustion engine in a step S1 in which variables are possibly initialized.

In a step S2 it is checked whether a predefined time duration DUR which has elapsed and/or a predefined distance KM which has been traveled since the last diagnostics and/or adaptation for cylinder-selective closed-loop lambda control ZLSR_CLOSED is less than a predefined threshold value THD__1. Alternatively, the predefined time duration DUR and the predefined distance KM are compared with different predefined threshold values. If the condition of step S2 is fulfilled, step S2 is repeated. If the condition of step S2 is not fulfilled, program execution is continued in a step S3.

In step S3 it is checked whether a LOAD value of the internal combustion engine is less than a predefined second threshold value THD__2. The value LOAD relates, for example, to a value of an intake manifold pressure or of a mass flow of air through the intake tract 1. If the condition of step S3 is not fulfilled, step S3 is repeated. If the condition of step S3 is fulfilled, program execution continues at step S4.

In step S4 it can be checked whether at least one predefined condition CON is fulfilled. The condition CON can be, for example, that the internal combustion engine is idling. If the condition of step S4 is not fulfilled, step S3 is repeated. If the condition of step S4 is fulfilled, program execution is continued in a step S5.

In step S5 a mass airflow setpoint value MAF_SP is determined depending on the torque request TQ and depending on the lambda probe LS. In particular, the mass airflow setpoint value MAF_SP is determined greater than would be necessary for implementing the torque request TQ and is selected large enough to enable the lambda probe LS used to differentiate between exhaust packets from different combustion chambers 9 of the internal combustion engine. Different lambda probes can have different sensitivities, so that determination of the mass airflow setpoint value MAF_SP may be preferably matched to the lambda probe LS used.

In a step S6, preferably simultaneously with step S5, an ignition angle IGA is determined as a function of the torque request TQ and the mass airflow setpoint value MAF_SP such that the torque request TQ is implemented, thereby in particular preferably reducing engine efficiency. Steps S5 and S6 can also be termed increasing a torque reserve, as sufficient air and fuel is present in the combustion chambers to implement a larger torque, this, however, being held in reserve by the retarded ignition angle IGA. In addition, in step S5 an individual ignition angle IGA can be adjusted for each spark plug 19.

In addition, preferably simultaneously with steps S5 and S6, a step S7 is executed in which sampling instants MES_TP of the lambda probe LS are matched to the ignition angle(s) IGA. For this purpose the sampling instants MES_TP are determined as a function of ignition angles IGA of the individual cylinders Z1-Z4.

In a step S8, in the course of cylinder-selective open-loop control ZLSR_OPEN, the injection valves 18 of the cylinders Z1-Z4 are driven to meter-in an individual-cylinder mass of fuel MFF (FIG. 3) which depends on the torque request TQ and/or on the mass airflow setpoint value MAF_SP. In addition, in step S8, the residual oxygen content of the respective exhaust packet is measured on an individual cylinder basis and the air/fuel ratio in the corresponding combustion chamber 9 prior to the combustion process is determined as a function thereof.

Alternatively, a step S9 can be executed in which cylinder-selective closed-loop lambda control ZLSR_CLOSED is activated. Also in step S9 an output signal of a closed-loop lambda controller for controlling the air/fuel ratio is detected.

In a step S10, by means of a diagnostics instruction DIAG, diagnostics are carried out and/or, by means of an adaptation instruction ADAPT, an adaptation parameter is determined as a function of which at least one operating parameter is adapted which affects one of the operating variables of the internal combustion engine, in particular an air/fuel ratio prior to the combustion process in the combustion chambers 9.

Diagnostics can include, for example, checking whether the air/fuel ratios in the different combustion chambers 9 are at least approximately the same. If the air/fuel ratios are not approximately equal, this can indicate one or more defective spark plugs 19 and/or injection valves 18 or wear of same.

Adaptation is performed, for example, if the diagnostics DIAG indicate defective operation of at least one of the cylinder components. For example, as an adaptation parameter, a factor or a summand can be determined which is used to adjust the operating parameter, e.g. an offset of the individual-cylinder mass of fuel injected. The adaptation value can be stored in an engine map e.g. via a deviation of the air/fuel ratios of the individual cylinders Z1-Z4. The map and likewise additional maps can be plotted e.g. on an engine test bed. As an alternative to the map, a model calculation by means of which the adaptation value can be determined as a function of measurement signals of the internal combustion engine can also be performed on the engine test bed. In the case of adaptation in a closed-loop control circuit ZLSR_CLOSED, the controller output signal for regulating the air/fuel ratio can also used for determining the adaptation value. In this case the controller output signal can in turn be used as the input signal of an engine map whose output value is the adaptation value. Here too a model calculation can be determined as an alternative to the map. Alternatively, the corresponding operating parameter can be adapted directly from a corresponding map or by means of a corresponding model calculation, without an adaptation parameter.

The adaptation value and/or the adjusted operating parameter can then be used to control the internal combustion engine during normal operation of the internal combustion engine, particularly in the lower partial load range.

The program for operating the internal combustion engine can be terminated in a step S11. However, the program for operating the internal combustion engine may preferably be executed regularly during operation of the internal combustion engine.

Figure 3:
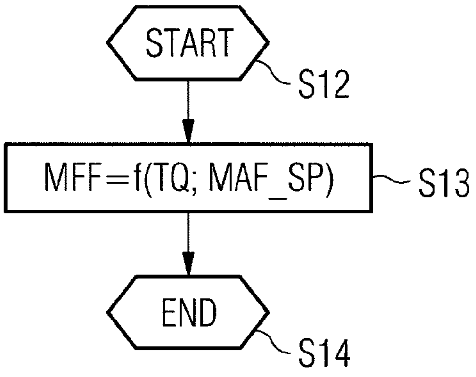
FIG. 3 shows a flowchart of a program for controlling the internal combustion engine.

A program for controlling the internal combustion engine may preferably be stored in the control device 25 (FIG. 3). Particularly in the lower partial load range in which no cylinder-selective closed-loop lambda control ZLSR_CLOSED can be implemented, the program for controlling the internal combustion engine is used to control the cylinders Z1-Z4, particularly the injection valves 18, on an individual cylinder basis.

The program for controlling the internal combustion engine may preferably be initiated in a step S12 (FIG. 3) in which variables are initialized if necessary. In addition, the program for controlling the internal combustion engine is initiated particularly in the lower partial load range of the internal combustion engine when cylinder-selective closed-loop lambda control ZLSR_CLOSED is not possible.

In a step S13, the individual-cylinder injected mass of fuel MFF is determined as a function of the torque request TQ and/or as a function of the mass airflow setpoint value MAF_SP and preferably using the adaptation value determined. The adaptation value and/or the individual-cylinder injected mass of fuel MFF may vary from cylinder Z1-Z4 to cylinder Z1-Z4. This is due to the fact that an injection valve 18 and/or the associated electronics are more or less worn and/or have a greater or lesser component tolerance than another of the injection valves 18. In addition, in step S13 at least one of the injection valves 18 may preferably be driven to meter-in the individual-cylinder mass of fuel MFF.

The program for controlling the internal combustion engine can be terminated in a step S14. The program for controlling the internal combustion engine may preferably be executed regularly during normal operation of the internal combustion engine, particularly in the lower partial load range.

What is claimed is:

1. A method for operating an internal combustion engine comprising at least two cylinders each incorporating a combustion chamber, and with an exhaust tract which communicates with the combustion chambers depending on positions of at least two exhaust valves and in which there is disposed at least one exhaust gas probe whose measurement signal is indicative of an air/fuel ratio prior to combustion of an air/fuel mixture in the combustion chambers, the method comprising the steps of:

in a lower partial load range of the internal combustion engine, as a function of a predefined torque request to the internal combustion engine, determining a setpoint value of a mass flow of air into the combustion chambers such that the mass flow of air is greater than is necessary for implementing the predefined torque request, and that the mass flow of air is large enough that individual exhaust packets from the combustion chambers can be differentiated from one another with the exhaust gas probe, actuating an actuator as a function of the setpoint value of the air/fuel ratio whose position affects the actual mass flow of air into the combustion chambers, and to implement the torque request, reducing engine efficiency simultaneously by actuating another actuator, detecting a measurement signal of the exhaust gas probe, determining the air/fuel ratio of the exhaust packets as a function of the measurement signal detected, and adapting at least one internal combustion engine operating parameter affecting the air/fuel ratio in at least one of the cylinders as a function of the air/fuel ratios.

2. The method according to claim 1, wherein the efficiency of the internal combustion engine is reduced by retarding an ignition angle at which the air/fuel mixture is ignited in the respective combustion chamber.

3. The method according to claim 2, wherein sampling instants of the exhaust gas probe are adapted to the ignition angle set.

4. The method according to claim 1, wherein the mass airflow setpoint value is only determined such that it is greater than is necessary for implementing the predefined torque request, and is large enough that individual exhaust packets from the different combustion chambers can be differentiated from one another with the exhaust gas probe, or wherein the thus determined mass airflow setpoint value is only implemented if at least one predefined condition for cylinder-selective closed-loop lambda control of the air/fuel ratio is fulfilled.

5. The method according to claim 1, wherein cylinder-selective closed-loop lambda control of the air/fuel ratios of the exhaust packets is activated and wherein the operating parameter is adapted as a function of an output signal of a closed-loop controller for regulating the air/fuel ratio.

6. A device for operating an internal combustion engine with at least two cylinders each incorporating a combustion chamber, and with an exhaust tract which communicates with the combustion chambers depending on positions of at least two exhaust valves and in which there is disposed at least one exhaust gas probe whose measurement signal is indicative of an air/fuel ratio prior to combustion of an air/fuel mixture in the combustion chambers, the device being operable, in a lower partial load range of the internal combustion engine, as a function of a predefined torque request to the internal combustion engine, to determine a setpoint value of a mass flow of air into the combustion chambers such that the mass flow of air is greater than is necessary for implementing the predefined torque request, and that the mass flow of air is large enough that exhaust packets from the combustion chambers can be differentiated from one another with the exhaust gas probe, to actuate, as a function of the setpoint value of the air/fuel ratio, an actuator whose position affects the actual mass flow of air into the combustion chambers, and in order to implement the torque request, to simultaneously reduce engine efficiency by actuating another actuator, to detect a measurement signal of the exhaust gas probe, to determine the air/fuel ratio of the exhaust packets as a function of the measurement signal detected, and to adapt, as a function of the air/fuel ratios determined, at least one internal combustion engine operating parameter affecting the air/fuel ratio in at least one of the cylinders.

7. The device according to claim 6, wherein the efficiency of the internal combustion engine is reduced by retarding an ignition angle at which the air/fuel mixture is ignited in the respective combustion chamber.

8. The device according to claim 7, wherein sampling instants of the exhaust gas probe are adapted to the ignition angle set.

9. The device according to claim 6, wherein the mass airflow setpoint value is only determined such that it is greater than is necessary for implementing the predefined torque request, and is large enough that individual exhaust packets from the different combustion chambers can be differentiated from one another with the exhaust gas probe, or wherein the thus determined mass airflow setpoint value is only implemented if at least one predefined condition for cylinder-selective closed-loop lambda control of the air/fuel ratio is fulfilled.

10. The device according to claim 6, wherein cylinder-selective closed-loop lambda control of the air/fuel ratios of the exhaust packets is activated and wherein the operating parameter is adapted as a function of an output signal of a closed-loop controller for regulating the air/fuel ratio.

11. An internal combustion engine comprising two cylinders each incorporating a combustion chamber, an exhaust tract which communicates with the combustion chambers depending on positions of at least two exhaust valves and in which there is disposed at least one exhaust gas probe whose measurement signal is indicative of an air/fuel ratio prior to combustion of an air/fuel mixture in the combustion chambers, and a control device being operable, in a lower partial load range of the internal combustion engine, as a function of a predefined torque request to the internal combustion engine, to determine a setpoint value of a mass flow of air into the combustion chambers such that the mass how of air is greater than is necessary for implementing the predefined torque request, and that the mass flow of air is large enough that exhaust packets from the combustion chambers can be differentiated from one another with the exhaust gas probe, to actuate, as a function of the setpoint value of the air/fuel ratio, an actuator whose position affects the actual mass flow of air into the combustion chambers, and in order to implement the torque request, to simultaneously reduce engine efficiency by actuating another actuator, to detect a measurement signal of the exhaust gas probe, to determine the air/fuel ratio of the exhaust packets as a function of the measurement signal detected, and to adapt, as a function of the air/fuel ratios determined, at least one internal combustion engine operating parameter affecting the air/fuel ratio in at least one of the cylinders.

12. The internal combustion engine according to claim 11, wherein the efficiency of the internal combustion engine is reduced by retarding an ignition angle at which the air/fuel mixture is ignited in the respective combustion chamber.

13. The internal combustion engine according to claim 12, wherein sampling instants of the exhaust gas probe are adapted to the ignition angle set.

14. The internal combustion engine according to claim 11, wherein the mass airflow setpoint value is only determined such that it is greater than is necessary for implementing the predefined torque request, and is large enough that individual exhaust packets from the different combustion chambers can be differentiated from one another with the exhaust gas probe, or wherein the thus determined mass airflow setpoint value is only implemented if at least one predefined condition for cylinder-selective closed-loop lambda control of the air/fuel ratio is fulfilled.

15. The internal combustion engine according to claim 11, wherein cylinder-selective closed-loop lambda control of the air/fuel ratios of the exhaust packets is activated and wherein the operating parameter is adapted as a function of an output signal of a closed-loop controller for regulating the air/fuel ratio.

16. The internal combustion engine according to claim 11, wherein the control device is coupled with at least one of a pedal sensor for detecting a position of an accelerator pedal, a mass airflow sensor, a throttle valve position sensor, a temperature sensor for detecting an intake air temperature, an intake manifold pressure sensor, and a crankshaft angle sensor.

17. The internal combustion engine according to claim 11, wherein the exhaust gas probe is disposed upstream of a catalytic converter.

18. The internal combustion engine according to claim 11, wherein the exhaust gas probe is a lambda probe.

19. The internal combustion engine according to claim 11, wherein actuator and another actuator are selected from the group consisting of: a throttle valve, an intake valve, an exhaust valve, an injection valve, and a spark plug.

* * * * *